United States Patent
West

[11] Patent Number: 5,139,324
[45] Date of Patent: Aug. 18, 1992

[54] STORAGE APPARATUS FOR USE WITH EYEWEAR

[76] Inventor: Allen D. West, Drawer 310, Catoosa, Okla. 74015

[21] Appl. No.: 578,193

[22] Filed: Sep. 6, 1990

[51] Int. Cl.⁵ .................................................. G02C 1/00
[52] U.S. Cl. .................................... 351/158; 351/156; 248/206.1
[58] Field of Search ..................... 351/156, 157, 158; 248/205.3, 206.1, 316.7

[56] References Cited

U.S. PATENT DOCUMENTS

| | | | |
|---|---|---|---|
| 4,903,925 | 2/1990 | Park | 248/206.1 |
| 4,938,581 | 7/1990 | Trickel | 351/156 |
| 5,046,696 | 9/1991 | Lee | 248/309.1 |

Primary Examiner—Paul M. Dzierzynski
Attorney, Agent, or Firm—Head & Johnson

[57] ABSTRACT

A storage apparatus for use with eyewear of the type worn on the face of the user having spaced apart lens portions connected by a nose portion in which the eyewear, when not in use, is conveniently placed for convenient retrieval, the storage apparatus having a base member and a holder member having opposed sides and having a cutout therein to receive the nose portion of eyewear therein, the holder member being secured to the base member and the base member being attachable to a support surface.

13 Claims, 1 Drawing Sheet

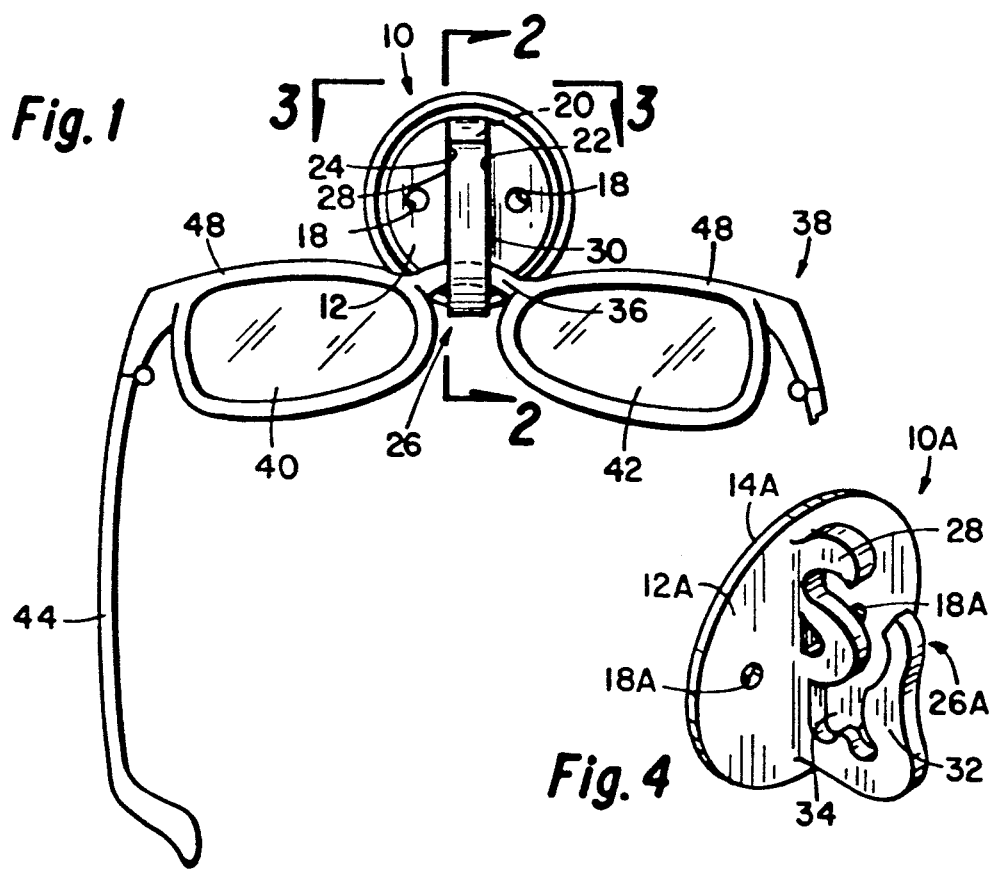
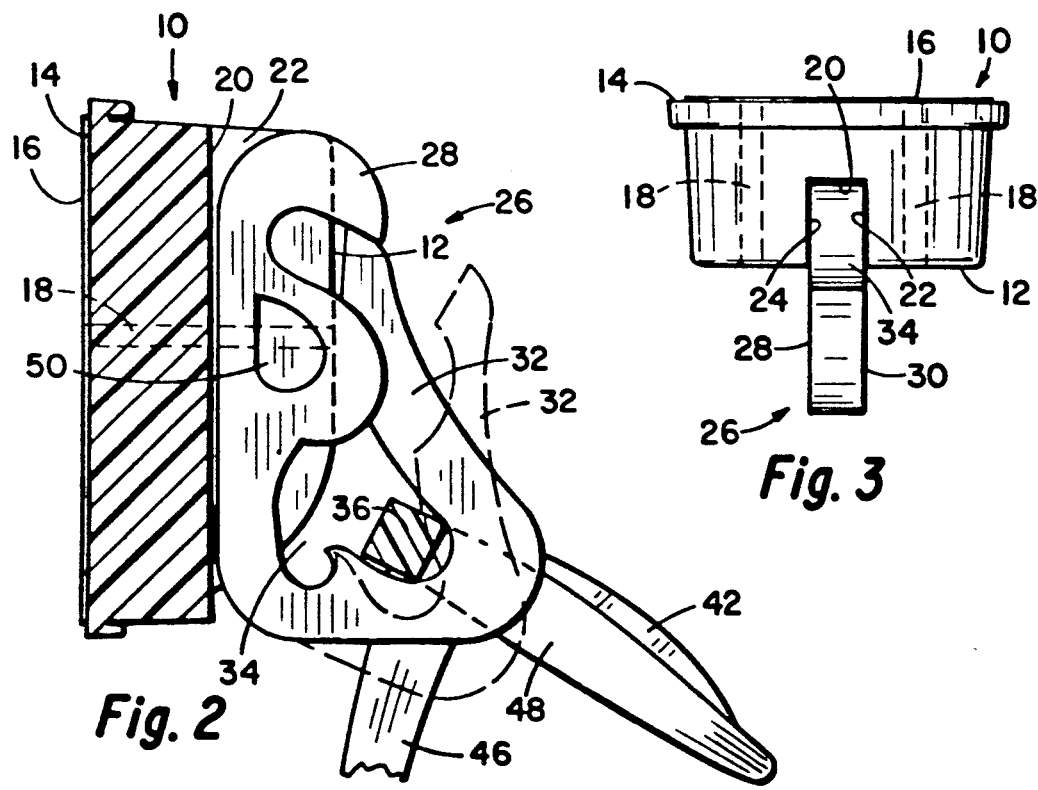

STORAGE APPARATUS FOR USE WITH EYEWEAR

BACKGROUND OF THE INVENTION

A large majority of people in the world today use eye glasses, either for correction of vision or to reduce the intensity of light, that is, sunglasses. Most users of eyewear have frequent need to remove the eyewear yet keep it conveniently located so as to be readily available when needed to be replaced back on the face of the user. Users typically place their removed eyewear in their shirt pocket, in a container or purse, or lay the eyewear down on a convenient location. Some users hang eyewear from the neckline of their shirt by extending one of the ear pieces inside the shirt and thereby allow the balance of the eyewear to hang on the front of the shirt.

All of these methods of storing eyewear when not in use have problems. Many shirts do not have pockets or if they have pockets, when the user bends over the eyewear is in danger of slipping out. Purses or containers for eyewear are frequently not readily available when the user needs to make immediate use of his eyewear, and when the eyewear is laid on a nearby surface it frequently is misplaced or lost entirely.

One method of retaining eyewear convenient to the user is by suspending it from a cord looped around the neck of the user. For examples of this convenience, reference may be had to U.S. Pat. Nos. 2,649,020; 2,798,409; and 2,941,268. These references show various means of attaching cords to the earpieces of eyewear and each requires some type of device attached to or formed integrally with the ear piece. These devices are not easily removable from the eyewear.

Others have provided clips for attaching to the eyewear such as shown in U.S. Pat. No. 2,766,500. Such clips require frictional engagement with the eyewear and the eyewear can be inadvertently dislodged from the clips. The present disclosure is intended to overcome limitations in eyewear retention devices such as illustrated in these previously issued patents. For reference to a holder for use with eyewear particularly adaptable for use in the practice of the invention herein, see U.S. Pat. No. 4,938,581 issued Jul. 3, 1990, to John Trickel, which is incorporated herein by reference.

SUMMARY OF THE INVENTION

The present disclosure is a stationary base member in combination with a holder for use with eyewear when the eyewear is of the type having spaced apart lens portions connected by a nose portion. The holder includes a unitary member made of flexible material, preferably plastic, and most preferably Teflon, however, nylon or other forms of plastic may also be used. The member has opposed generally paralleled sides and an external peripheral surface. A cutout is formed within the member, and the cutout communicates with the external peripheral surface. The cutout provides an integral leg portion and an integral hook portion. In the locked mode, the leg portion extends under and is retained by the hook portion. To change from the locked to the unlocked mode, the leg portion can be snapped, by flexing the member, out from under the hook portion to provide an opening through which the nose portion of eyewear can pass.

While a holder for eyewear is conveniently employed utilizing a cord to loop around the neck of the user, in some instances it is more convenient to utilize a holder for positioning eyewear where it is readily convenient but in which it is not carried by the user. For instance, many people like to have sunglasses readily available to wear when driving. The present disclosure includes a unique and convenient means of retaining eyeglass in position for easy storage and quick and ready use. A base member is employed having a rear surface and a front surface. The rear surface is provided with means for attachment to a support surface, such as a car dashboard, and, therefore, the rear surface can be provided with adhesive so that it is readily attachable to a vertical support surface. The base member front surface has a slot therein, preferably vertical, which slidably receives the retention member parallel sides. With the base member used in cooperation with the retention member, the user has the option of wearing the retention member on a cord around his/her neck or utilizing the base member for convenient positioning of eyewear for ready retrieval or storage when the eyewear is not to be carried with the user.

In another embodiment of the invention, the holder and the base may be formed as a unitary item which can be secured to a vertical surface with adhesive or screws.

A better understanding of the invention will be had by reference to the following description and claims, taken in conjunction with the attached drawings.

DESCRIPTION OF THE DRAWINGS

FIG. 1 is an elevational view of the improved holder for use with eyewear including a base member which is attachable to a vertical support surface and showing the retention member received by the base member and with eyewear retained by the retention member.

FIG. 2 is a vertical cross-sectional view taken along the line 2—2 of FIG. 1, showing the base member in cross-sectional view and showing the retention member and with the eye glasses shown partially, that is, with only a portion of the ear piece of the eye glasses and showing the retention member in solid outline as the retention member is closed to the locked position and in dotted outline with the retention member in the open position.

FIG. 3 is a plan top view taken along the line 3—3 of FIG. 1 showing the base member and the retention member but without the eyewear.

FIG. 4 is an isometric view of a holder for eyewear in which the holder and base are formed as a unitary item.

DESCRIPTION OF THE PREFERRED EMBODIMENT

Referring to FIGS. 1, 2 and 3, a preferred embodiment of the invention is illustrated. A base member is generally indicated by the numeral 10. The base member has a front surface 12 and a rear surface 14.

The base member 10 is designed to be supported to a vertical support surface, such as a wall, a dashboard or the like. Means must be provided for securing the base member 10 to such a vertical support surface. This can be accomplished primarily in two ways, one is by use of adhesive 16. The adhesive may be preferably of the type which is attached to the base member during the manufacturing process and covered by a peel-off cover so that the user can peel off the cover (not shown) and expose the adhesive 16, so that it can thereby be immediately applied to a vertical surface.

Another means for supporting base member 10 is by the use of screws (not shown), and for this propose screw hole 18 are provided in the base member extending from the front surface 12 to the rear surface 14.

The base member is further defined by a vertical slot 20 having opposed side walls 22 and 24.

When the base member 10 with vertical slot 20 is affixed to a vertical surface, it is configured to readily receive an eyewear holder retention member such as of the type generally indicated by the numeral 26 which may be, by example, and as illustrated, of the type described in U.S. Pat. No. 4,938,851. Generally, such a retention member is formed of plastic such as nylon and is a unitary member having opposed parallel external sides 28 and 30. The width between sides 28 and 30 is that which is substantially equal to the spacing between the base member vertical slots side walls 22 and 24. In this way retention member 26 may be forced into slot 20 so that the base member retains the retention member on a permanent bases or, if desired, the retention member 26 may be easily and quickly removed from the base member 10 by applying manual force on it to pull it out of engagement with slot 20.

Generally speaking, the retention member 26 is of a device having a fixed body portion with a leg portion being moveable between a closed position as shown in solid outline and an open position as shown in dotted outline in FIG. 2.

The retention member 26 has a cutout 34 therein to receive the nose piece 36 of eyewear, the eyewear being generally indicated by the numeral 38.

Referring to FIG. 1, typical eyewear 38 is shown including opposed lens 40 and 42, ear pieces 44 and 46 and with the nose piece 36 interconnecting the portions of the frame 48 which retain lens 40 and 42.

FIG. 1 shows the stationary holder for use with eyewear of this disclosure such as mounted on a vertical surface, the vertical surface not being shown and with the holder used to support eyewear 38 herein. The retention member 26, when of the type illustrated including a pivotal leg portion 32, can be used to retain eyewear 38 against inadvertent displacement, such as when used in an automobile, boat or other vehicle. When there is a possibility of the eyewear being inadvertently dislodged, the leg portion 32 may be moved to the locked or closed position. On the other hand, if base member 10 is supported on a solid stationary surface, such as a wall adjacent the telephone, adjacent the desk or the like wherein there is no likelihood of the eyewear being dislodged, the retention member 26 may be of the type that provides a hook portion which is achieved when the leg portion 32 is left in the open position.

The advantage of the arrangement as shown in FIGS. 1, 2 and 3 is that it permits retention member 26 to be removed and utilized in other applications for retaining the eyewear. For instance, a cord (not shown) may be placed through a second cutout 50 in the retention member 26 and thereby the eyewear holder may be worn around the neck of the user to retain eyewear 38, and thereafter retention member 26 be positioned within base member 10 for retention of eyewear 38.

FIG. 4 illustrates another embodiment of the invention in which the holder and base are cast as a unitary object. The base 10A is integrally formed with the holder 26A. The portions 28, 32 and 34 of the holder 26A are shaped and function as previously described with respect to the embodiment of FIGS. 1 through 3.

In FIG. 4, the base 10A has a front surface 12A which integrally receives the holder portion 26A. The base has a rear surface 14A (not seen in FIG. 4) which can receive adhesive the same as adhesive 16 in FIG. 2. In addition, base 10A has screw holes 18A by which the unit can be secured to a surface as previously described with reference to FIGS. 1 and 2.

The embodiment of FIG. 4 functions like that of FIGS. 1 through 3 except that the holder 26A is not removable from the base 10A.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A storage apparatus for use with eyewear of the type worn on the face of the user having spaced apart lens portions connected with a nose portion in which the eyewear when not in use is conveniently placed for convenient retrieval, comprising:

a base member having a rear surface and a front surface, the front surface of said base member having a vertical slot therein with spaced apart sidewalls;

an eyewear holder member having an external peripheral surface and having a cutout therein providing communication with the member external peripheral surface, the cutout providing an opening to receive the nose portion of eyewear therein whereby the nose portion of eyewear is receivable in said cutout, and the holder member having opposed sides, the width between the holder sides being dimensioned to be retainably received in the base member vertical slot;

means to affix said holder member to said front surface of said base member; and means to attach said base member to a support surface whereby said rear surface is generally vertical.

2. A storage apparatus for use with eyewear according to claim 1 wherein said holder member has an unlocked mode providing an opening to receive the nose portion of eyewear therein and a locked mode wherein an eyewear nose portion is surrounded by the holder member.

3. A storage apparatus for use with eyewear according to claim 1 wherein said holder member is slideably positionable within said base member slot and is retainable in said slot by frictional engagement of said slot sidewalls with said holder member opposed sidewalls.

4. A storage apparatus for use with eyewear according to claim 1 wherein said cutout in said holder member provides an integral hook portion, and provides therebelow an integral leg portion, the leg portion being extendable under said hook portion to provide said locked mode and wherein by flexing said retention member said leg portion can be removed from under said hook portion to provide access to pass an eyewear nose portion into and out of said cutout.

5. A storage apparatus for use with eyewear according to claim 1 wherein said base member has a back exterior surface that is generally flat.

6. A storage apparatus for use with eyewear according to claim 5 including: adhesive secured to said base member rear surface providing said means to attach said base member to a support surface.

7. A storage apparatus for use with eyewear according to claim 1 wherein said base member has at least one screw receiving opening therethrough from said front to said rear surface providing said means to attach said base member to a support surface.

8. A storage apparatus for use with eyewear of the type worn on the face of the user having spaced apart lens portions connected with a nose portion in which the eyewear when not in use is conveniently placed for convenient retrieval, comprising:

a base member having a rear surface and a front surface, said front surface of said base member having a vertical slot therein with spaced apart sidewalls;

an eyewear holder member having an external peripheral surface and having a cutout therein providing communication with the member external peripheral surface, the cutout providing an opening to receive the nose portion of eyewear therein whereby the nose portion of eyewear is receivable in said cutouts, the holder member having opposed sides, wherein said holder member is slideably positionable within said base member slot and is retainable in said slot by frictional engagement of said slot sidewalls with said holder member opposed sidewalls;

means to affix said holder member to said front surface of said base member; and means to attach said base member to a support surface whereby said rear surface is generally vertical.

9. A storage apparatus for use with eyewear according to claim 8 wherein said holder member has an unlocked mode providing an opening to receive the nose portion of eyewear therein and a locked mode wherein an eyewear nose portion is surrounded by the holder member.

10. A storage apparatus for use with eyewear according to claim 8 wherein said cutout in said holder member provides an integral hook portion, and provides therebelow an integral leg portion, the leg portion being extendable under said hook portion to provide said locked mode and wherein by flexing said retention member said leg portion can be removed from under said hook portion to provide access to pass an eyewear nose portion into and out of said cutout.

11. A storage apparatus for use with eyewear according to claim 8 wherein said base member has a back exterior surface that is generally flat.

12. A storage apparatus for use with eyewear according to claim 11 including:

adhesive secured to said base member rear surface providing said means to attach said base member to a support surface.

13. A storage apparatus for use with eyewear according to claim 8 wherein said base member has at least one screw receiving opening therethrough from said front to said rear surface providing said means to attach said base member to a support surface.

* * * * *